(12) United States Patent
Joseph et al.

(10) Patent No.: US 11,226,346 B2
(45) Date of Patent: Jan. 18, 2022

(54) ELIMINATING SOURCE LAMP INTENSITY DRIFT EFFECT USING REFERENCE MEASUREMENT BETWEEN CUVETTES

(71) Applicant: Siemens Healthcare Diagnostics Inc., Tarrytown, NY (US)

(72) Inventors: Joson K. Joseph, Bear, DE (US); Bestin Abraham, Newark, DE (US); Frank Krufka, Kirkwood, PA (US); Tan Bui, Middletown, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 419 days.

(21) Appl. No.: 16/319,287

(22) PCT Filed: Jul. 19, 2017

(86) PCT No.: PCT/US2017/042932
§ 371 (c)(1),
(2) Date: Jan. 18, 2019

(87) PCT Pub. No.: WO2018/017762
PCT Pub. Date: Jan. 25, 2018

(65) Prior Publication Data
US 2019/0285659 A1  Sep. 19, 2019

Related U.S. Application Data

(60) Provisional application No. 62/365,294, filed on Jul. 21, 2016.

(51) Int. Cl.
*G01N 35/00* (2006.01)
*G01N 21/27* (2006.01)
*G01N 21/25* (2006.01)

(52) U.S. Cl.
CPC ..... *G01N 35/00693* (2013.01); *G01N 21/253* (2013.01); *G01N 21/274* (2013.01);
(Continued)

(58) Field of Classification Search
None
See application file for complete search history.

(56) References Cited

U.S. PATENT DOCUMENTS

| | | |
|---|---|---|
| 3,554,654 A | 1/1971 | Paatzsch et al. |
| 4,305,723 A | 12/1981 | Kolber et al. |

(Continued)

FOREIGN PATENT DOCUMENTS

| | | |
|---|---|---|
| CN | 2695954 Y | 4/2005 |
| CN | 101275912 A | 10/2008 |

(Continued)

OTHER PUBLICATIONS

English translation of JP 2008-304478, date: (2008), Onuma, Takehiko.*

(Continued)

*Primary Examiner* — Kathryn Wright

(57) ABSTRACT

A computer-implemented method for calibrating a photometer in an in-vitro diagnostics analyzer includes generating a cuvette map of a reaction ring identifying a plurality of cuvette locations. The cuvette map is used to identify a plurality of reference measurement areas between the plurality of cuvette locations. A plurality of reference measurements are acquired in the reference measurement areas using the photometer. The photometer is automatically calibrated based on a comparison of the reference measurements to a predetermined standard setup of the photometer.

14 Claims, 20 Drawing Sheets

(52) U.S. Cl.
CPC ............... *G01N 35/00732* (2013.01); *G01N 2201/0256* (2013.01); *G01N 2201/0415* (2013.01); *G01N 2201/12715* (2013.01)

(56) References Cited

U.S. PATENT DOCUMENTS

| | | | |
|---|---|---|---|
| 4,549,809 A * | 10/1985 | Minekane | G01N 21/27 356/409 |
| 4,614,434 A | 9/1986 | Welch et al. | |
| 6,723,287 B1 * | 4/2004 | Ootatsume | G01N 21/253 198/465.2 |
| 2005/0288908 A1 | 12/2005 | Wei | |
| 2007/0181787 A1 * | 8/2007 | Nishigaki | G01N 21/253 250/227.14 |
| 2009/0320583 A1 | 12/2009 | Hemmings | |
| 2010/0150779 A1 | 6/2010 | Chow et al. | |
| 2010/0161267 A1 | 6/2010 | Bartel et al. | |
| 2011/0017905 A1 * | 1/2011 | Yeo | G01D 5/366 250/231.14 |
| 2013/0310268 A1 * | 11/2013 | Christiansen | G01N 21/276 506/9 |
| 2015/0029331 A1 | 1/2015 | Ha | |
| 2015/0301035 A1 | 10/2015 | Meyer et al. | |
| 2015/0355208 A1 | 12/2015 | German et al. | |
| 2016/0228876 A1 * | 8/2016 | Chu | G01N 21/6486 |
| 2016/0237474 A1 * | 8/2016 | Marks | G01N 21/274 |
| 2017/0176478 A1 * | 6/2017 | Harbers | G01N 21/55 |
| 2020/0068683 A1 * | 2/2020 | Waser | H05B 47/11 |

FOREIGN PATENT DOCUMENTS

| | | |
|---|---|---|
| CN | 101368901 A | 2/2009 |
| CN | 104515745 A | 4/2015 |
| CN | 105164513 A | 12/2015 |
| EP | 0 303 707 A1 | 2/1989 |
| EP | 1 811 285 A1 | 7/2007 |
| EP | 2607883 A1 | 6/2013 |
| FR | 2 470 962 A1 | 6/1981 |
| JP | S64-000451 A | 1/1989 |
| JP | H08-271519 A | 10/1996 |
| JP | 2007 127583 A | 5/2007 |
| JP | 2007-198739 A | 8/2007 |
| JP | 2007-322246 A | 12/2007 |
| JP | 2008-304478 A | 12/2008 |
| JP | 2008304478 A * | 12/2008 |
| JP | 2009 162719 A | 7/2009 |

OTHER PUBLICATIONS

Extended EP Search Report dated Jul. 5, 2019 of corresponding European Application No. 17831828.3, 6 Pages.

PCT International Search Report and Written Opinion dated Oct. 6, 2017 (9 Pages).

* cited by examiner

OPTICAL AREA OF CUVETTES

ELIMINATING SOURCE LAMP INTENSITY DRIFT EFFECT USING REFERENCE MEASUREMENT BETWEEN CUVETTES

CROSS-REFERENCE TO RELATED APPLICATIONS

This application claims the benefit of U.S. Provisional Application Ser. No. 62/365,294 filed Jul. 21, 2016, which is incorporated herein by reference in its entirety.

TECHNICAL FIELD

The present invention relates generally to methods, systems, and apparatuses for acquiring reference measurements between cuvettes in an in-vitro diagnostics system. The technology described herein may be applied to, for example, eliminate the effect of source lamp intensity drift that may otherwise adversely affect the acquisition of photometric measurements.

BACKGROUND

In-vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers ("analyzers") onto which fluid containers, such as tubes or vials containing patient samples, have been loaded.

One component of the analyzer system is a reaction turntable that includes one or more reaction rings. Each reaction ring is arranged into multiple segments, with each segment containing multiple reaction vessels or "cuvettes." Photometer readings are taken at uniform spacing to calculate absorbance measurement in each cuvette. A design control or manufacturing issue of cuvette segments causes these vessels to be spaced unevenly or irregularly within and among segments, making it challenging (if not impossible) to get accurate photometer measurement.

The photometer includes a number of components that contribute to its sensitivity, including the photometer's source lamp. The source lamp has a tendency to slowly change, or "drift," during normal operations. This drift can induce an error in the accuracy and precision of the test results that the module produces. The impact of the drift can be reduced by taking reference measurements periodically, and recalibrating the instrument accordingly. However, it is challenging to acquire such periodic measurements in conventional analyzer systems without affecting system performance due to positioning/alignment issues.

SUMMARY

Embodiments of the present invention address and overcome one or more of the above shortcomings and drawbacks by providing methods, systems, and apparatuses related to the reduction, or elimination, of drift in a photometer's source lamp using reference measurements acquired based on a map of cuvette locations. Using the techniques described herein, cuvette mapping may be performed as an automatic alignment routine for each cuvette in the system. The mapping is used to identify locations for acquiring reference measurements that, in turn, may be used to calibrate the photometer and eliminate the effect of source lamp intensity drift.

According to some embodiments, a computer-implemented method for calibrating a photometer in an in-vitro diagnostics analyzer includes generating a cuvette map of a reaction ring identifying a plurality of cuvette locations. The cuvette map is used to identify a plurality of reference measurement areas between the plurality of cuvette locations. A plurality of reference measurements is acquired in the reference measurement areas using the photometer. The photometer is automatically calibrated based on a comparison of the reference measurements to a predetermined standard setup of the photometer. In some embodiments, the aforementioned method is repeated after a pre-determined period following calibration of the photometer, recalibrating the photometer based on a comparison of new reference measurements to the predetermined standard setup.

Various enhancements, refinements, and other modifications may be made to the aforementioned method in different embodiments of the present invention. For example, in some embodiments, the plurality of reference measurements are acquired while acquiring a plurality of signal measurements corresponding to the plurality of cuvette locations. The reference measurements and the signal measurements may be oversampled in at least one dimension (e.g., time and/or position). In some embodiments, variance values corresponding to the reference measurements may be determined and, prior to calibrating the photometer, the reference measurements can be filtered based on the variance values. Additionally, cuvette quality and incubation bath quality can be measured based on the variance values.

According to another aspect of the present invention, a second computer-implemented method for calibrating a photometer in an in-vitro diagnostics analyzer includes identifying a plurality of reference measurement areas between a plurality of cuvette locations in a cuvette segment assembly on a reaction ring. A plurality of reference measurements is acquired in the reference measurement areas using the photometer. Then, source lamp drift in the photometer is corrected by adjusting one or more calibration parameters based on a comparison of the reference measurements to a predetermined standard setup of the photometer. In some embodiments of this method, a cuvette map of the reaction ring is generated identifying the plurality of cuvette locations. This map may be used, for example, to identify the plurality of reference measurement areas. Additionally, the features of the other methods discussed above may be applied in different embodiments of this second method for calibrating the photometer. For example, the reference measurements used for the comparison to the predetermined standard setup may be filtered based on their variance values prior to correcting source lamp drift.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawing. For the purpose of illustrating the invention, there is shown in the drawing embodiments that are presently preferred, it being understood, however, that the invention is not limited to the specific instrumentalities disclosed. Included in the drawing are the following Figures.

DETAILED DESCRIPTION

The following disclosure describes the present invention according to several embodiments directed at methods, systems, and apparatuses related to eliminating the source lamp intensity drift effect using reference measurements between cuvettes in an in-vitro diagnostics system. The techniques described herein overcome cuvette alignment issues of conventional in-vitro diagnostics systems using cuvette-mapping during startup. More specifically, a cuvette map is used to identify specific, in-between-cuvette regions to take reference measurements. These reference measurements are further analyzed to verify the validity of the readings and identify cuvette bath clarity or contamination.

The tendency of the edges (leading and trailing) of a reaction ring vessel to block a light source is used to detect the vessel edges. Using the cuvette mapping techniques described herein, a photometer collects and analyzes the stream of readings, while the reaction ring makes a complete rotation after an initial homing. One wavelength (e.g., 596 nm) is used to detect the vessel edges. The data may be binarized (i.e., translated into a binary representation) with a threshold value (e.g., 90%) calculated from an initial set of readings. Cuvette mapping may be performed without any impact to the startup time of the instrument. Cuvette mapping provides a highly repeatable triggering point for photometric measurement. The techniques described herein also provide the optimal measurement area to oversample the input for high precision results.

Figure 1A:
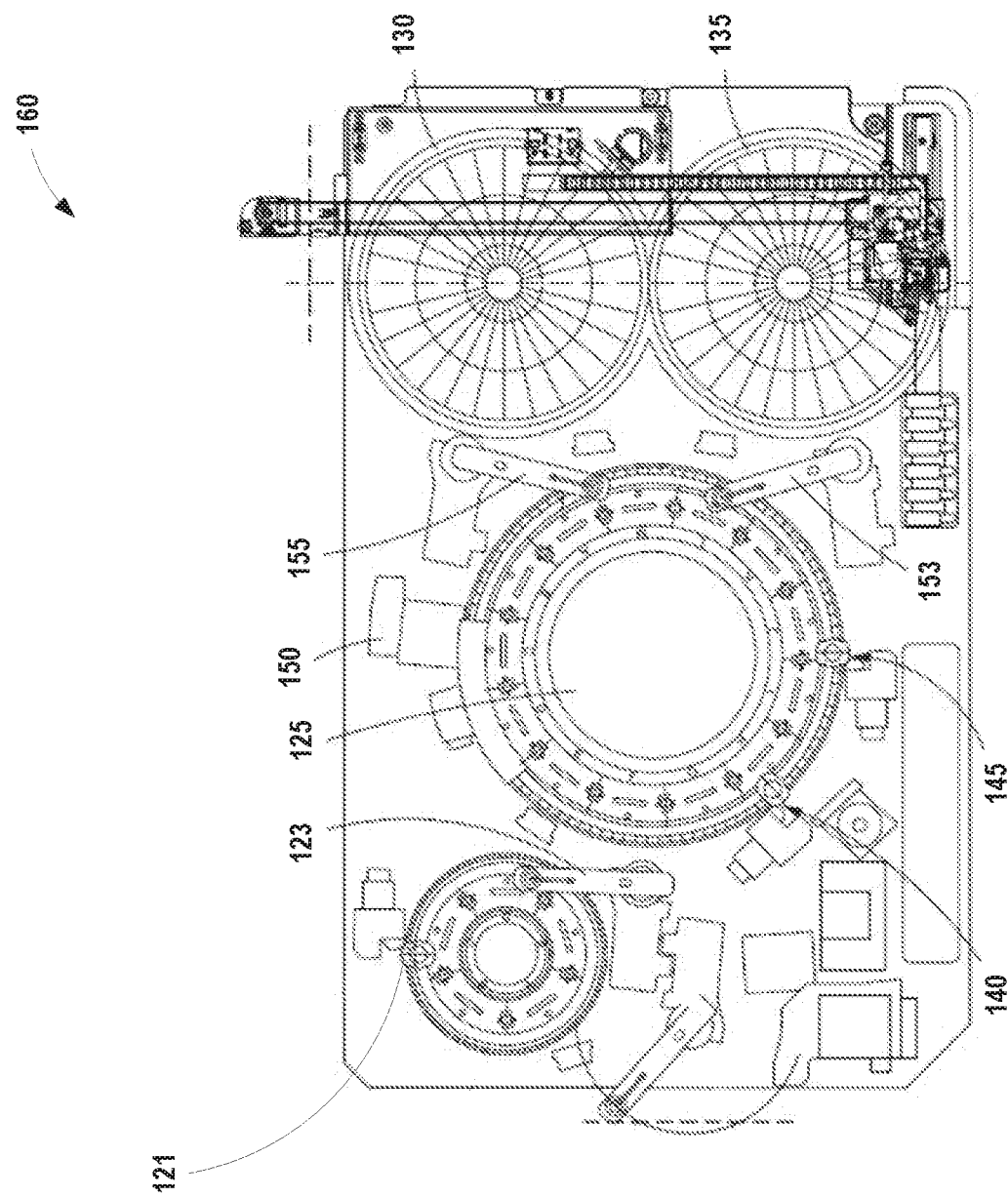
FIG. 1A is a top down view of electromechanical systems for an exemplary analyzer module for use with some embodiments.

To provide context to the present invention, FIG. 1A is a top down view of electromechanical systems for an exemplary analyzer module 160 for use with some embodiments. Sample arm 123 is responsible for aspirating a sample portion prepared by dilution mixer 121, moving above a reaction ring 125, and dispensing that sample portion into a cuvette. The reaction ring may include cuvette segment assembly as described below with respect to FIG. 1B. Reagents can be added before the sample arrives, or after the sample arrives via reagent arm 153 or reagent arm 155. Reagent servers 130 and 135 include a variety of different reagents, allowing a variety of tests to be performed by analyzer module 160. Reagent arms 153 and 155 move aliquots of reagents from reagent server 135 or reagent server 130, respectively. These aliquots are then dispensed into cuvettes in reaction ring 125. Reaction ring 125 moves cuvettes in a predetermined sequence such that each cuvette reaches reagent mixer 140 or sample mixer 145 for mixing. Once mixed, the reaction between the sample and reagent proceeds in the cuvette. Reaction ring 125 rotates to allow photometer 150 to take photometric measurements of the reaction at predetermined times.

Figure 1B:
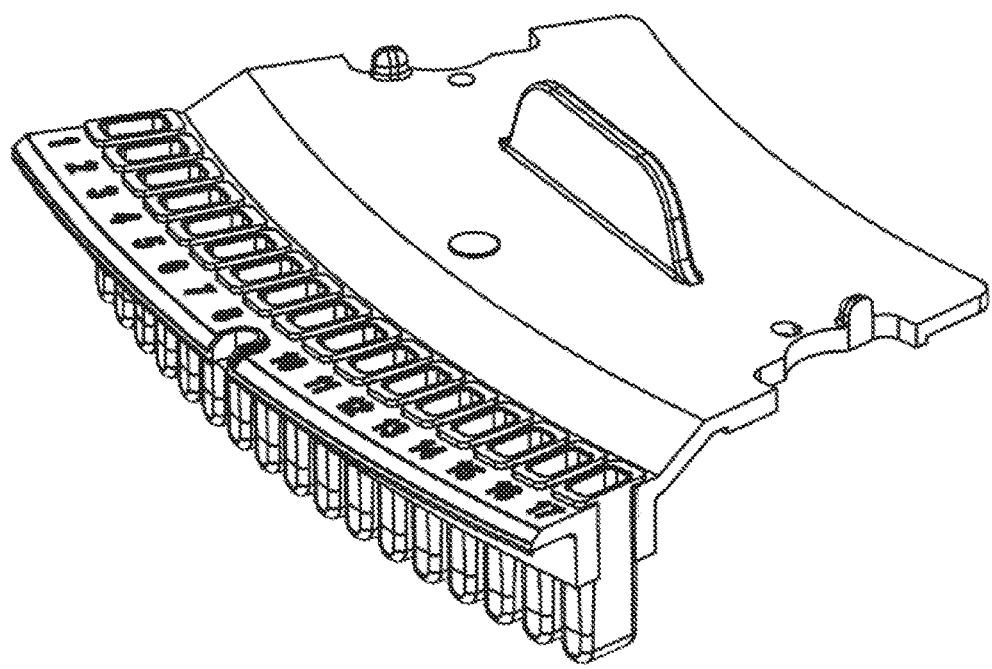
FIG. 1B shows a view of an example cuvette segment assembly with cuvettes installed in a side view.
Figure 1C:
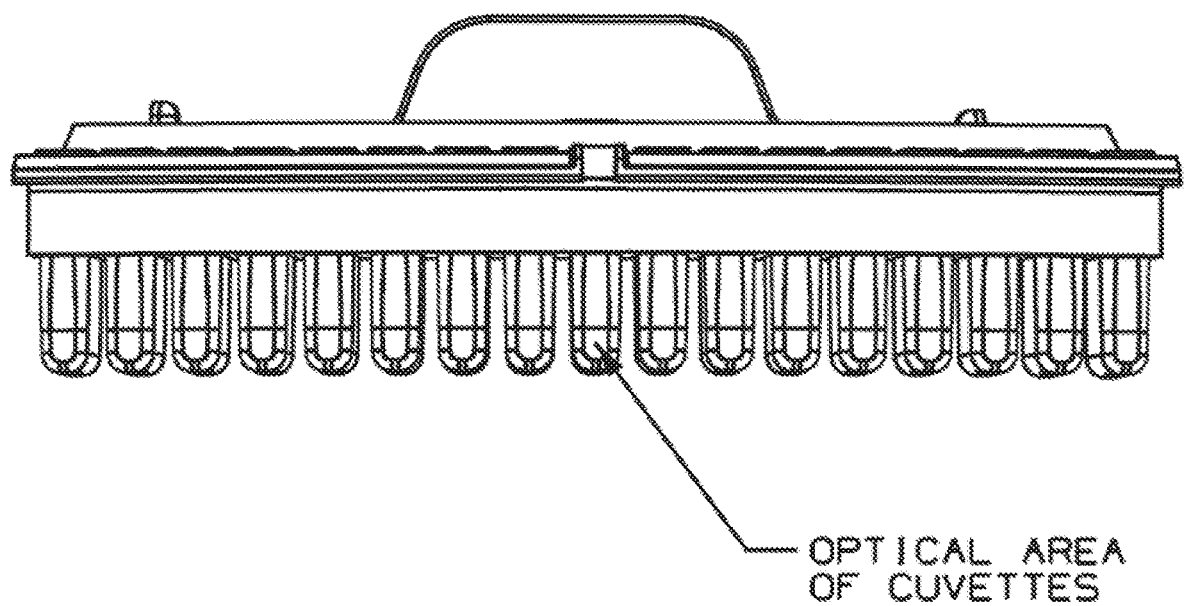
FIG. 1C shows a view of an example cuvette segment assembly with cuvettes installed in a front view.

An analyzer reaction ring comprises a plurality of cuvettes organized across a plurality of segments. FIGS. 1B and 1C show a view of an example cuvette segment assembly with cuvettes installed in a side and front view, respectively. Each cuvette is a small tube designed to hold samples for spectroscopic experiments. Cuvettes are sealed at one end and have a circular cross-section or, as illustrated in FIG. 2B the cross section may be square or rectangular. Square or rectangular cross-sections are generally used to avoid refraction artifacts while making photometric measurements. Various materials may be used to construct cuvettes including, without limitation, optical glass, UV quartz, IR quartz, or sapphire. FIG. 1C shows an alternative view of the shown in FIG. 1B. The view provided in FIG. 1B illustrates that the lower portion of each cuvette includes a small window referred to herein as the "optical area." During the photometric measurement, light emitted by the photometer is directed to the optical area of the cuvette.

Photometer readings are triggered at uniform spacing on the breadboard design. A design control or manufacturing issue of some cuvette segments causes these vessels to be spaced unevenly or irregularly within and among segments. There is no pattern to the spacing. The techniques described herein provide a cuvette mapping process that may be implemented in any combination of hardware and software to map the triggering point dynamically. The tendency of the edges (leading and trailing) of the reaction ring vessel to block the light source is used to detect the vessel edges. The gaps between the edges are not uniform. Software for controlling the photometer, referred to herein as the "Photometer Device Control Manager (DCM)" collects and analyzes the stream of measurements, while the reaction ring makes a complete rotation slowly after an initial homing. One wavelength is used to detect the vessel edges and the data gets binarized with a threshold calculated from an initial set of measurements. Thus, values above the threshold are set to one value (e.g., "1"), while values below the threshold are asset to another value (e.g., "0"). In some embodiments, the aforementioned wavelength is 596 nm and the threshold is 90%.

The DCM measurements rise and fall between zero and positive values. The transition of the signal that rises to a peak is referred to as a "rising edge," while the transition of the signal that falls from the peak is referred to as the "falling edge." A rising edge of the gap that is the trailing edge of the vessel is used to calculate the "trigger point" of that vessel. A rising edge can happen only due to an absence of obstruction, while a falling edge can be due to any obstruction, including debris or bubble. The falling edge is de-bounced longer to avoid noise. The rising edge is checked against a window (e.g., 5%) and will be flagged if it falls out of this tolerance window.

A final check of edge detection may be carried out at the host computer level, and vessels will be flagged as unusable if the edges are detected out of tolerance. The term "flagging" in this context means creating a record that the vessel is unusable. Prior to using the vessel during testing, this record is read by the analyzer and only vessels not designated as unusable will be filled with samples, etc. The flag may also be used to generate an alert or other message (e.g., log file entry) to notify users that that the vessel is not usable.

The main controller (host computer) that coordinates the devices (DCMs) also controls the "offset" into the vessels to trigger photometer measurements. Reference measurements are taken at every gap, and one filtered reference measurement is sent to the host for absorbance calculation. The entire routine of edge detection may be completed in a relatively brief time period (e.g., around 20 seconds in some implementations), including homing the reaction ring before and after. The "bad" vessels are flagged as un-usable and this mapping routine may be called every time a reaction ring gets ready for reservation processing.

A host can integrate cuvette mapping into its overall photometric measurement process as follows. Initially, the reaction ring is aligned to the mechanical home position where the photometer light beam will be in between two reaction vessels. This is the ring's home position (0). Next, the photometer encoder is reset to 0, and the host commands the Photometer DCM to capture edge data. Then, the host slowly rotates the reaction ring past one rotation (e.g., 223 slots) and reads the edge data from the Photometer DCM. Subsequently, the host re-homes the ring and asks the Photometer DCM to compute trigger points from the edges detected (as described in further detail below with reference to FIG. 1). The host can then start indexing to collect photometric measurements based on those trigger points. Horizontal alignment to the photometer is eliminated. All probes can be aligned to the ring at its mechanical home position, and the photometer is aligned to the reaction ring (vessel and gap for reference) automatically.

Figure 2:
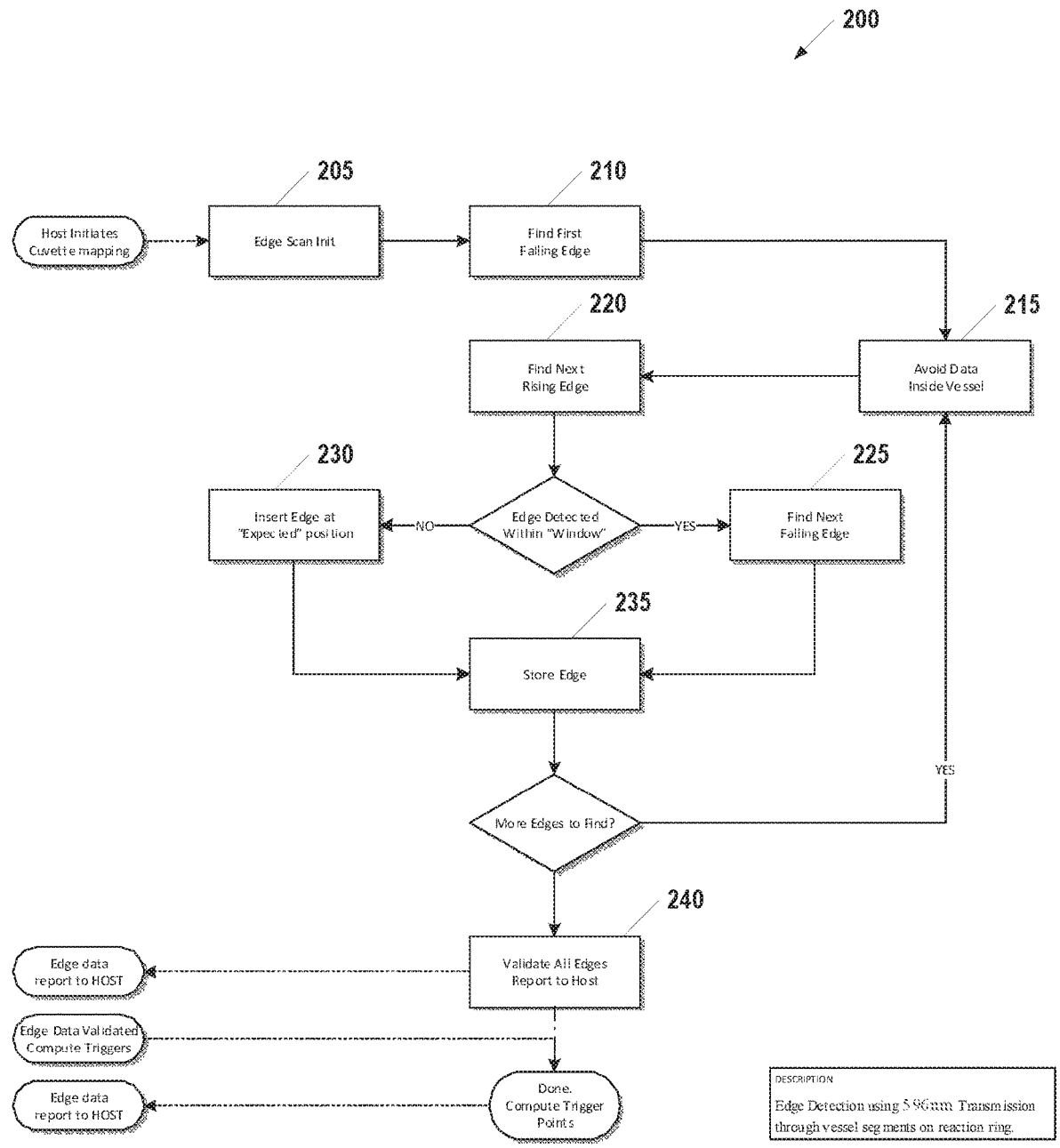
FIG. 2 illustrates a cuvette mapping process that may be performed by a Photometer Device Control Manager (DCM), according to some embodiments.

FIG. 2 illustrates a cuvette mapping process 200 that may be performed by a Photometer DCM, according to some embodiments. The term cuvette mapping, as used herein, refers to the process of identifying where the cuvettes are located on the reaction ring and where gaps between cuvettes are located. It should be noted that certain numerical values are provided herein as examples of the measurements that may be gathered and utilized during the cuvette mapping process 200; however, it should be understood that other values may be used for these measurements in other embodiments of the present invention. Starting at step 205, an edge scan initialization procedure is performed during which operational counters are initialized. During step 205, the photometer encoder may be configured to trigger conversions every 20 encoder counts until the threshold value is calculated from the first 200 points.

Continuing with reference to FIG. 2, the first falling edge is detected at step 210. Measurements are performed at step 210, confirming that the above threshold value is seen within the first 2000 encoder counts, and the below threshold value is seen in the next 2000 encode counts. Based on the measurements, the DCM latches the falling edge transition position. Next, at step 215, to avoid data in the vessel interior, the system confirms that the below threshold value is seen consecutively 26 times from 2000 encoder counts away from the last falling edge that was detected. The term "vessel interior," as used herein refers to the portion of the vessel between the two edges. At step 220, the next rising edge is found. During step 220, the system latches to the rising edge. The DCM waits for a minimum "50" count wide high level. If there is not a rising edge within 4000 encoder counts from the last falling edge, a report may be issued indicating that an edge is missing. This report may take various forms including, without limitation, a message sent to the host computer or a remote computer for display and/or recording (e.g., in a log file). This message may designate relevant information such as the time, clinical test information, and/or the location of the missing edge with respect to the reaction ring.

If an edge is detected within the "window," the next falling edge is detected at step 225, and the system latches to the falling edge. The DCM waits for a minimum count wide low level (e.g., 500). If a falling edge is not detected within 4000 encoder counts from the last rising edge, a missing cuvette report may be issued. This report may take various forms including, without limitation, a message sent to the host computer or a remote computer for display and/or recording. These contents of the report may designate relevant information such as the time, clinical test information, the location of the cuvette with respect to the reaction ring, and/or a cuvette identifier. Conversely, if an edge is not detected within the "window," step 230, an edge is inserted at the "expected" position. Next, at step 235, the DCM saves the rising edge and the falling edge of the current gap between cuvettes. The DCM then determines whether the edge scan is complete. In some embodiments, the edge scan is deemed completed if a certain number of gaps are found (e.g. corresponding to the number of vessel locations in the vessel ring assembly on the reaction ring). For example, in one embodiment, the scan is complete if 221 gaps are found. In other embodiments, the scan is complete once the first measured gap is measured for a second time. If there are more edges to find, the cuvette mapping process 200 may be repeated starting at step 215. Conversely, if there are no other additional edges to be detected, the edges are validated and reported to the host at step 240.

Figure 3A:
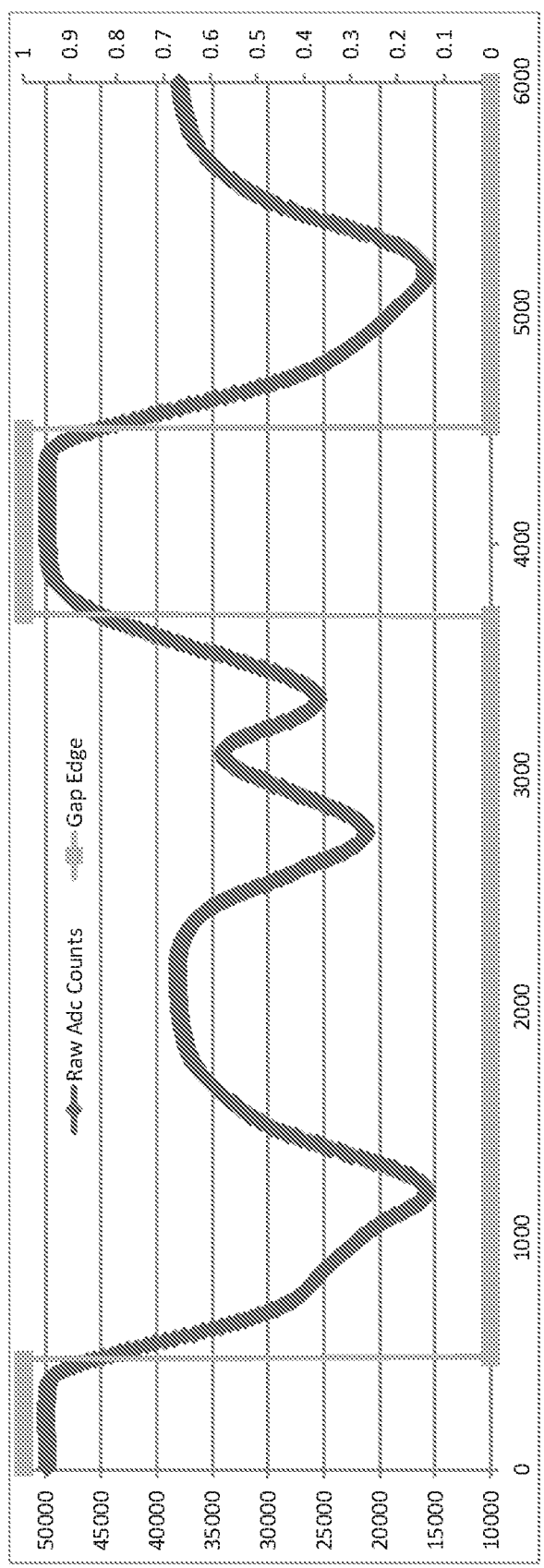
FIG. 3A illustrates how light transmission through a vessel may be correlated to gap edges during performance of a cuvette mapping process according to the techniques described herein.
Figure 3B:
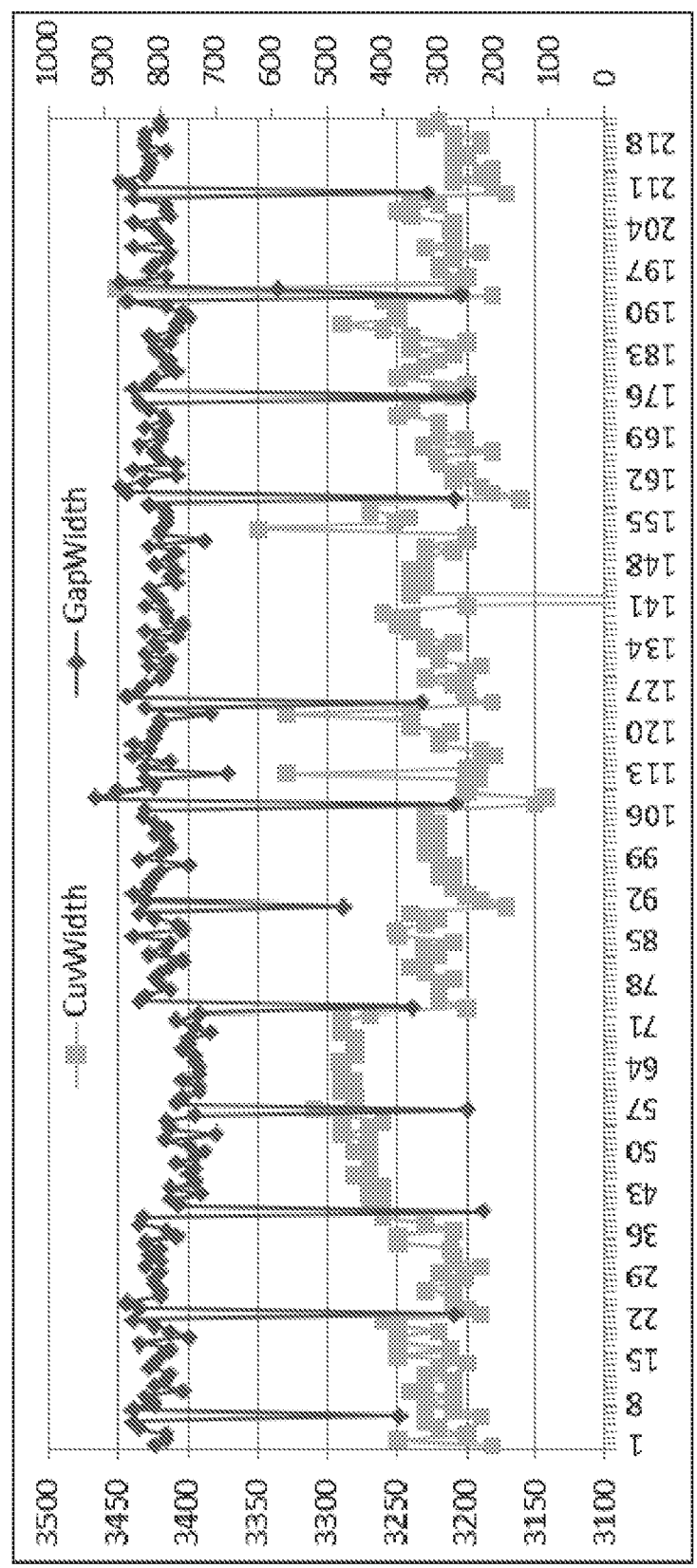
FIG. 3B illustrates sample edge detection results that may be generated using a cuvette mapping process.
Figure 3C:
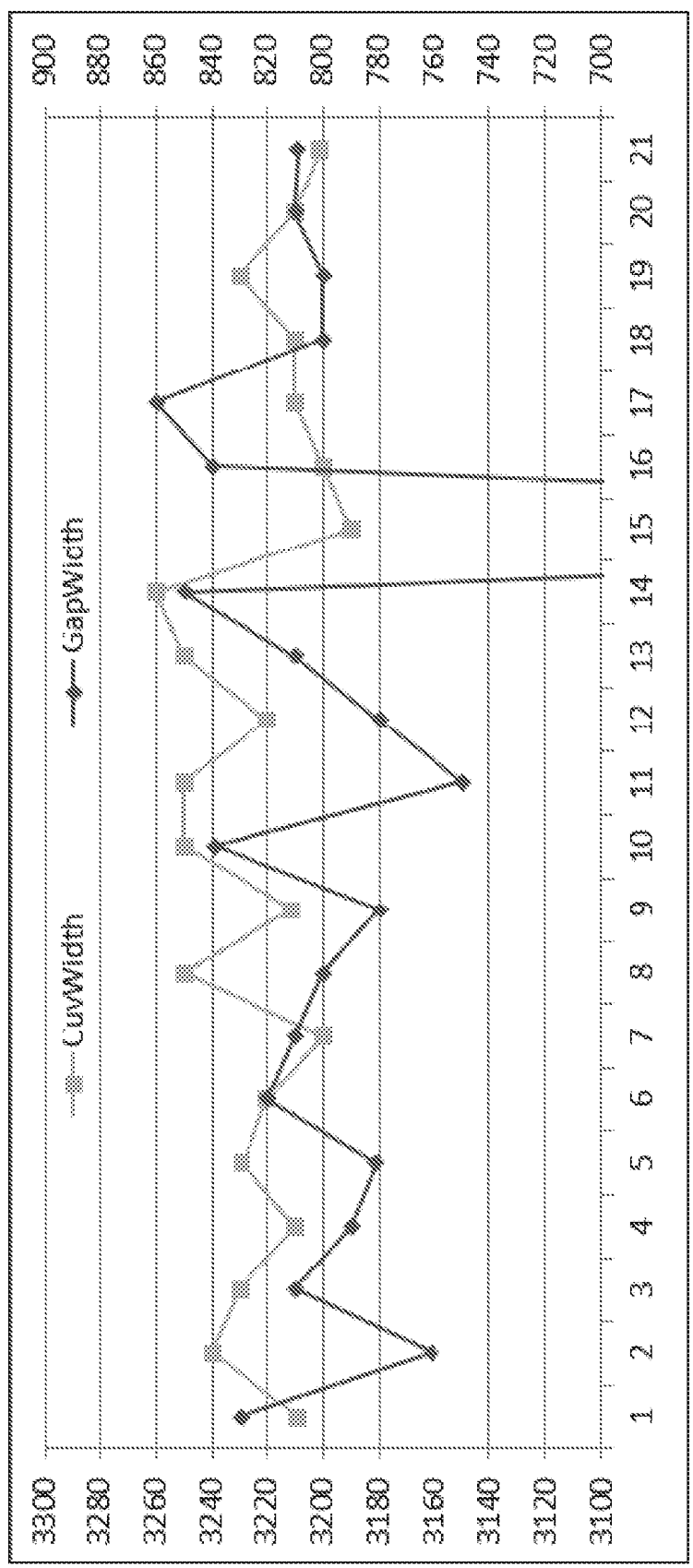
FIG. 3C provides a detailed view of edges 10-30 shown in FIG. 3B.

FIG. 3A illustrates how light transmission through a vessel (as determined by encoder counts) may be correlated to gap edges during performance of a cuvette mapping process according to the techniques described herein. FIG. 3B illustrates sample edge detection results that may be generated using such a process. In this example, the gap between cuvettes is normally around 800 counts, except in between segments it is approximately 300. The variation in a vessel's inside width is due to the variation of angular placement of the vessel in its slot. FIG. 3C provides a detailed view of edges 10-30.

Figure 4A:
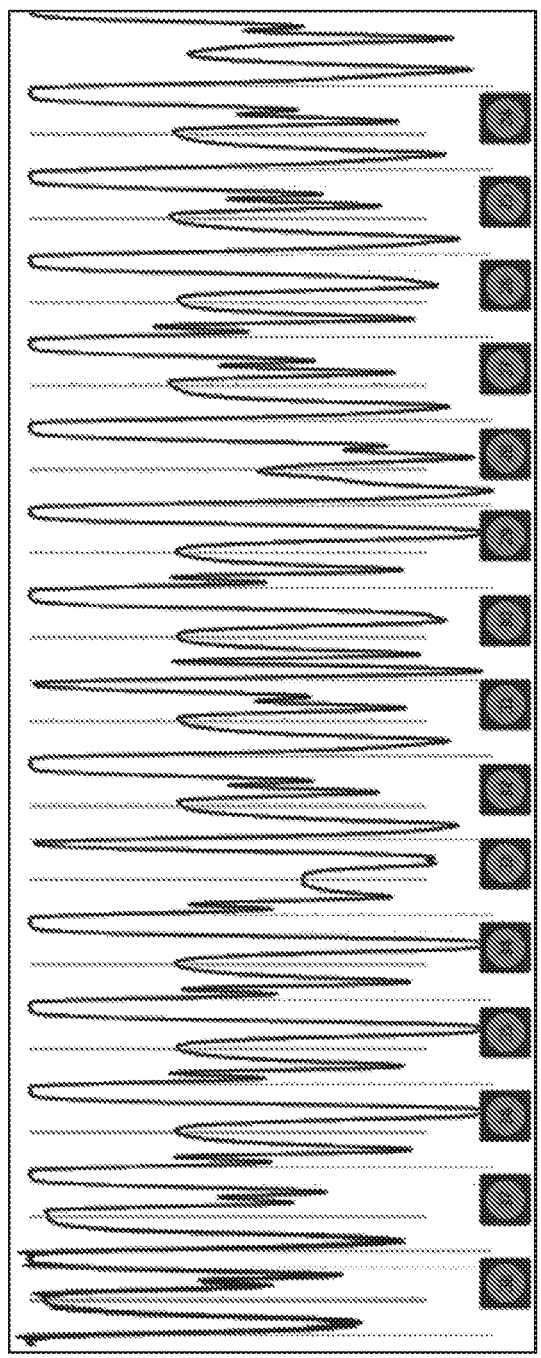
FIG. 4A shows a snapshot of the data collected during a typical execution of the process, according to some embodiments.
Figure 4B:
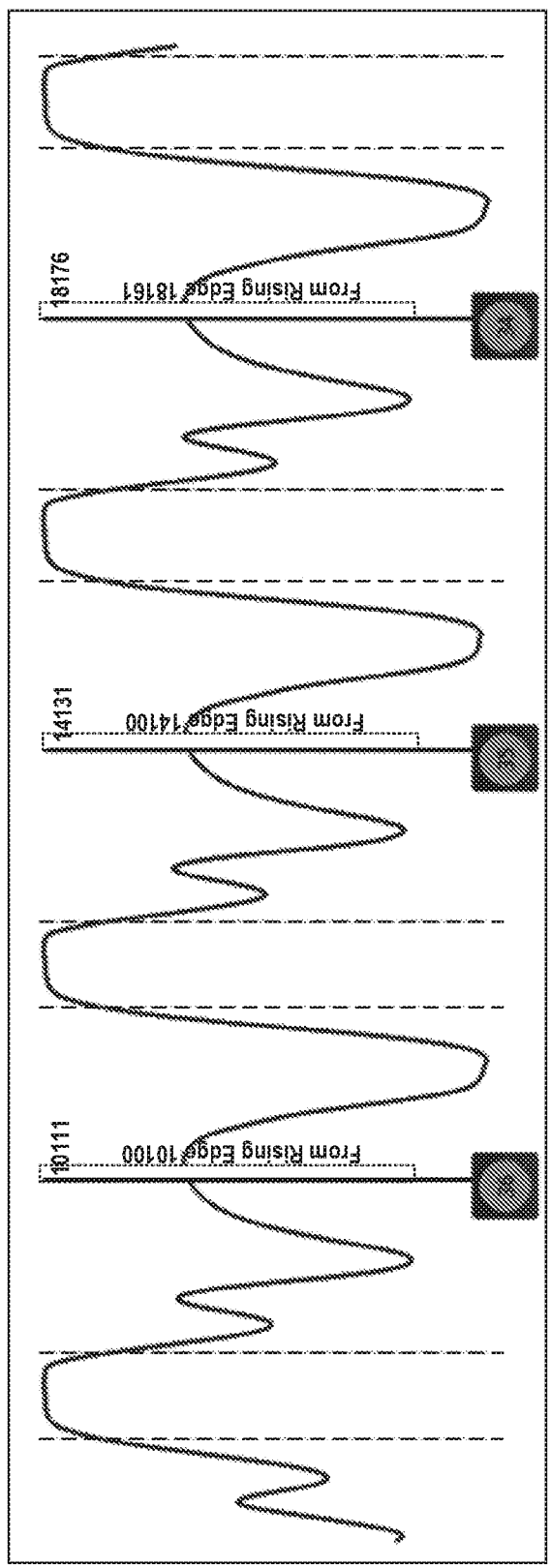
FIG. 4B provides a detailed view of several edges shown in FIG. 4A.
Figure 4C:
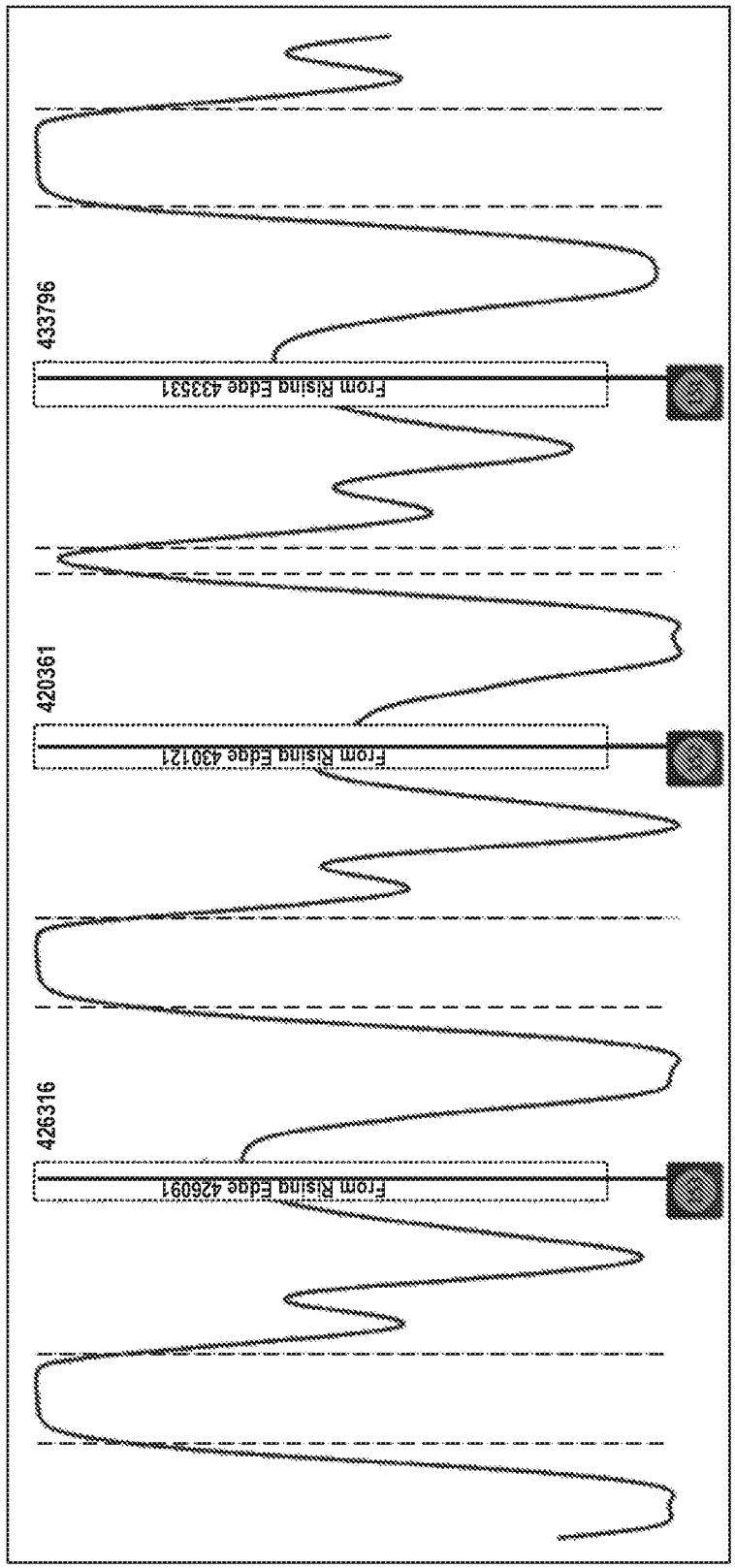
FIG. 4C illustrates the short gap between segments.
Figure 4D:
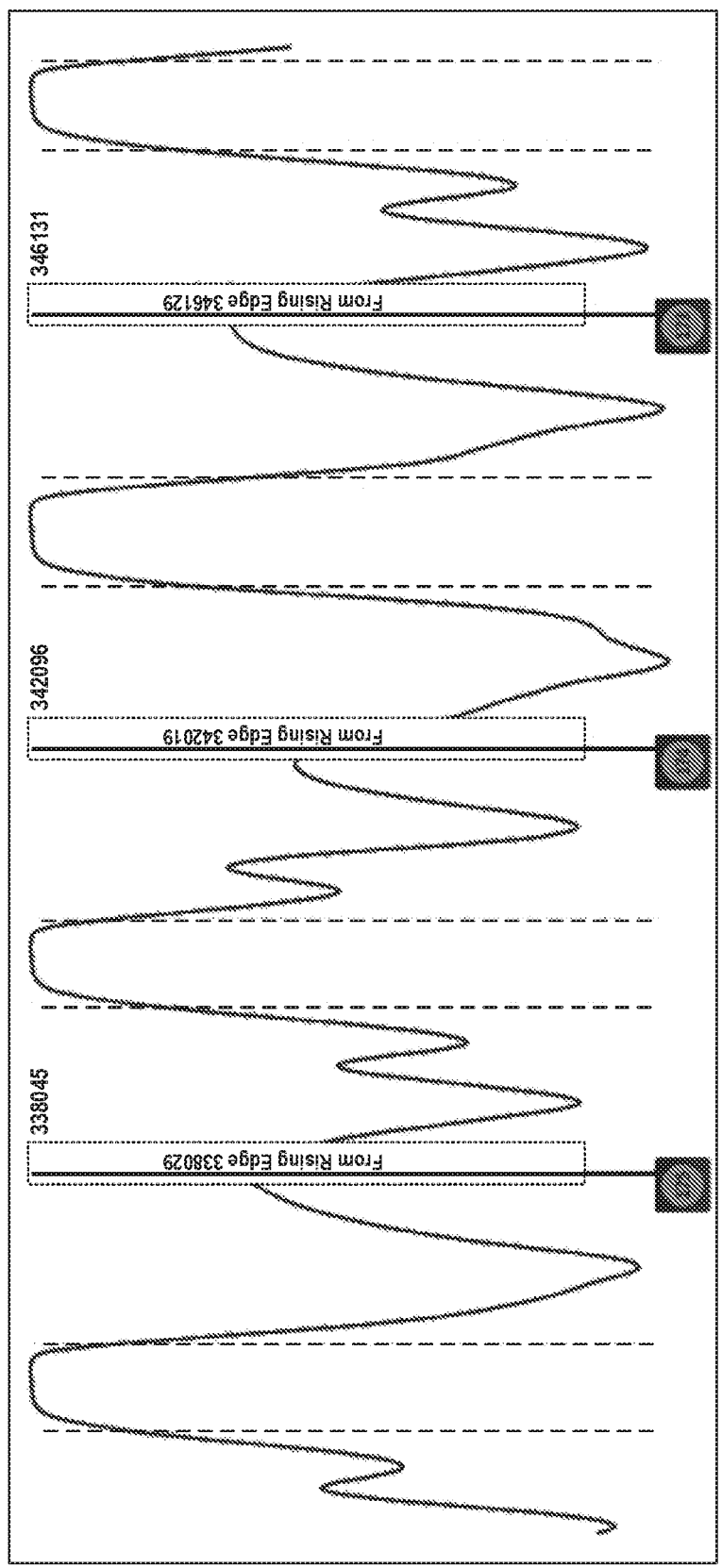
FIG. 4D provides an example of an uneven gap.
Figure 4E:
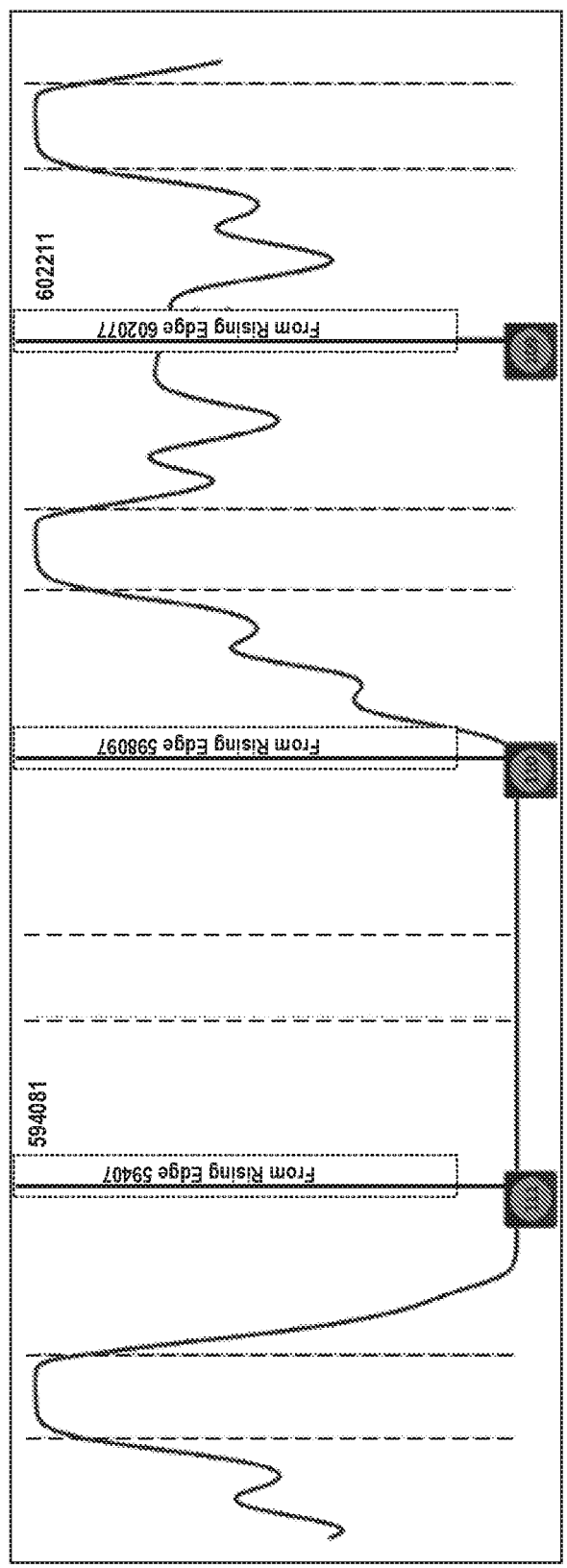
FIG. 4E shows an example in which one gap is masked off, but the next edge is detected correctly, as may be implemented in a cuvette mapping process according to the techniques described herein.
Figure 4F:
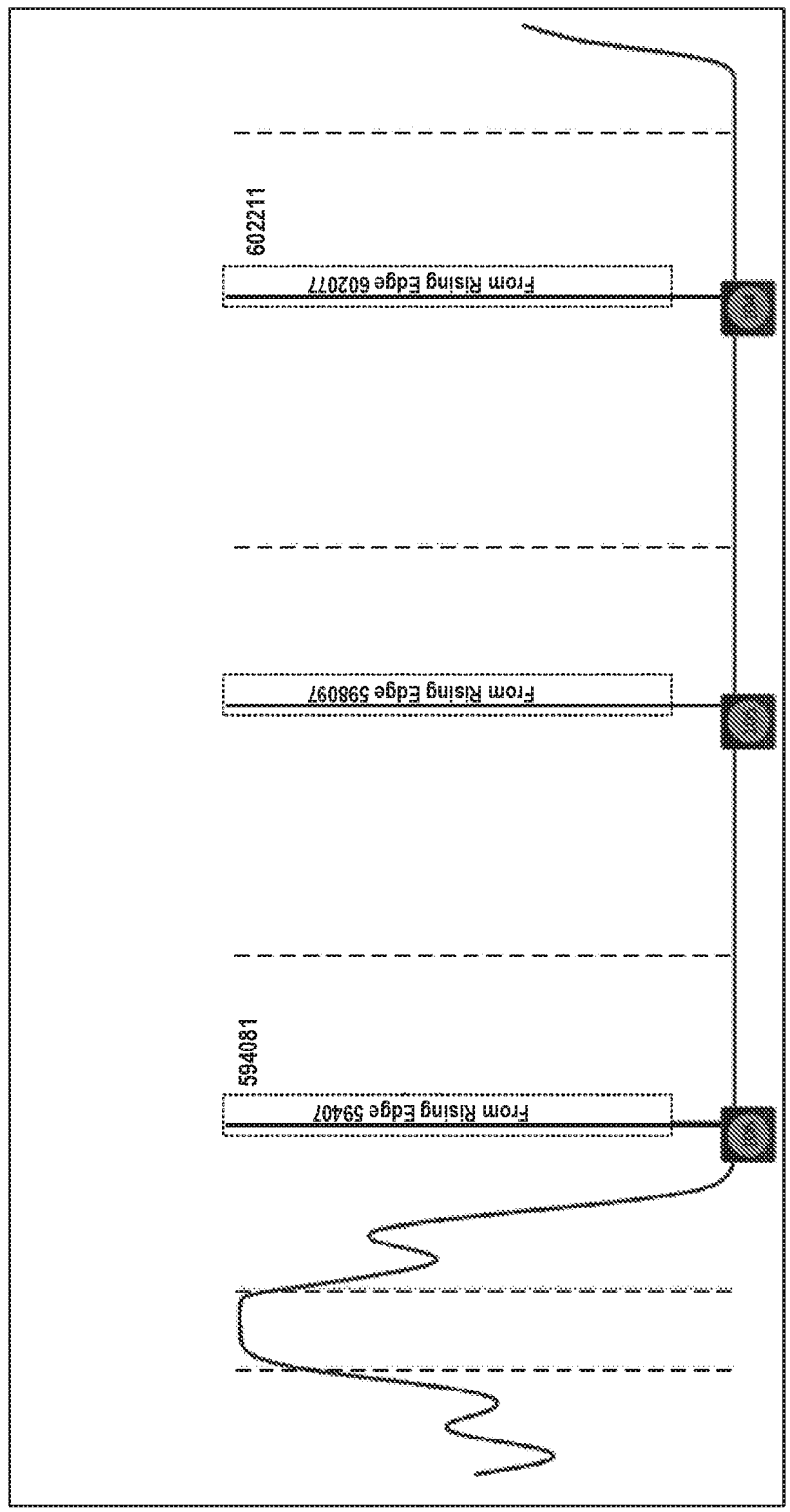
FIG. 4F depicts how multiple consecutive gaps may be masked off and the next gap edge is still detected correctly using the techniques described herein.
Figure 4G:
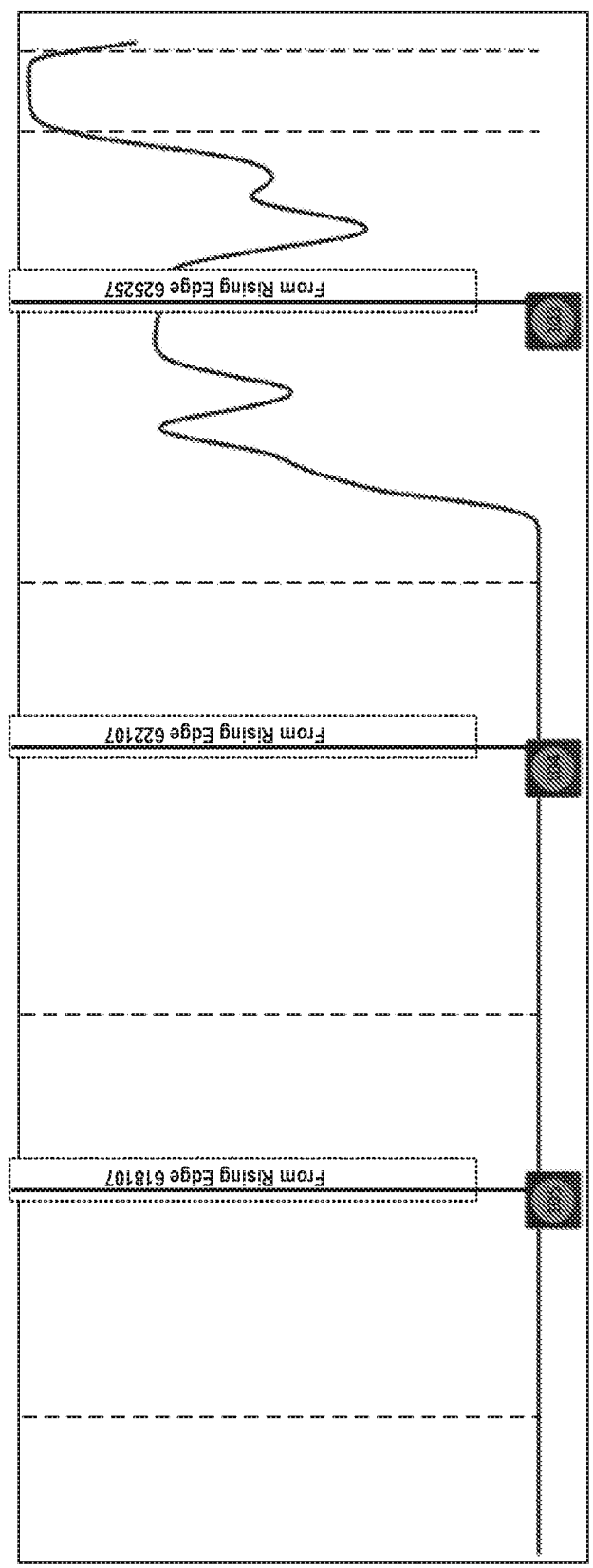
FIG. 4G provides a continuation of the visualization shown in FIG. 4F.
Figure 4H:
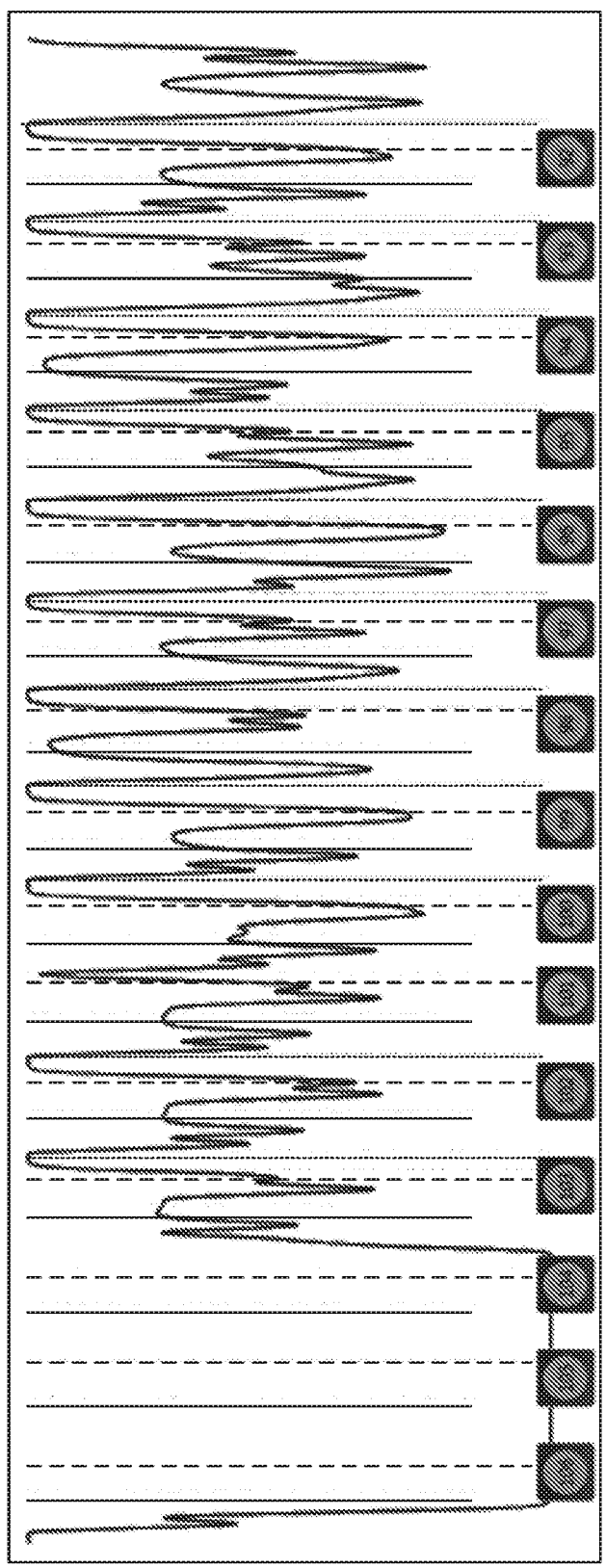
FIG. 4H provides an additional view where three gaps are masked off.

FIGS. 4A-4G provide an example visualization of data collected during a cuvette mapping process, according to some embodiments of the present invention. FIG. 4A shows a snapshot of the data collected during a typical execution of the process. FIG. 4B provides a detailed view of a several edges. FIG. 4C illustrates the short gap between segments. FIG. 4D provides an example of an uneven gap. FIG. 4E shows an example in which one gap is masked off, but the next edge is detected correctly. FIGS. 4F and 4G (which should be viewed as continuous) depict how multiple gaps (3 in this example) may be masked off, and the next gap edge is still detected correctly using the techniques described herein. FIG. 4H provides an additional view where three consecutive vessels are masked off.

Figure 5:
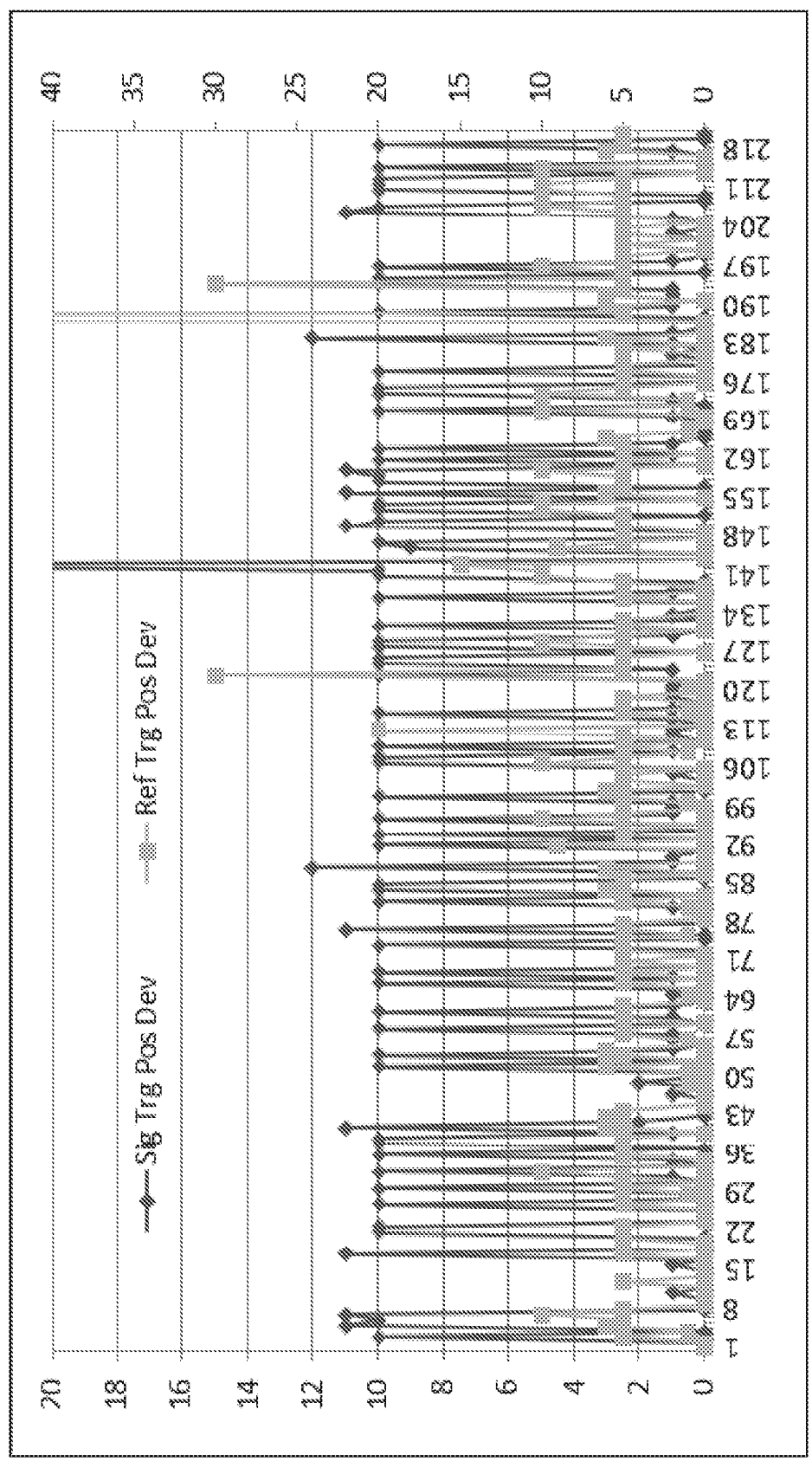
FIG. 5 provides an illustration of additional mapping test results generated using a cuvette mapping process, according to the techniques described herein.

FIG. 5 provides an illustration of additional mapping test results generated using a cuvette mapping process, according to the techniques described herein. More specifically, the edges detected and the calculated trigger points for cuvettes in a segment are depicted in FIG. 5. The scan resolution in this example is 10 encoder counts. The outliers are caused by the (simulated) missing edge tests.

Figure 6A:
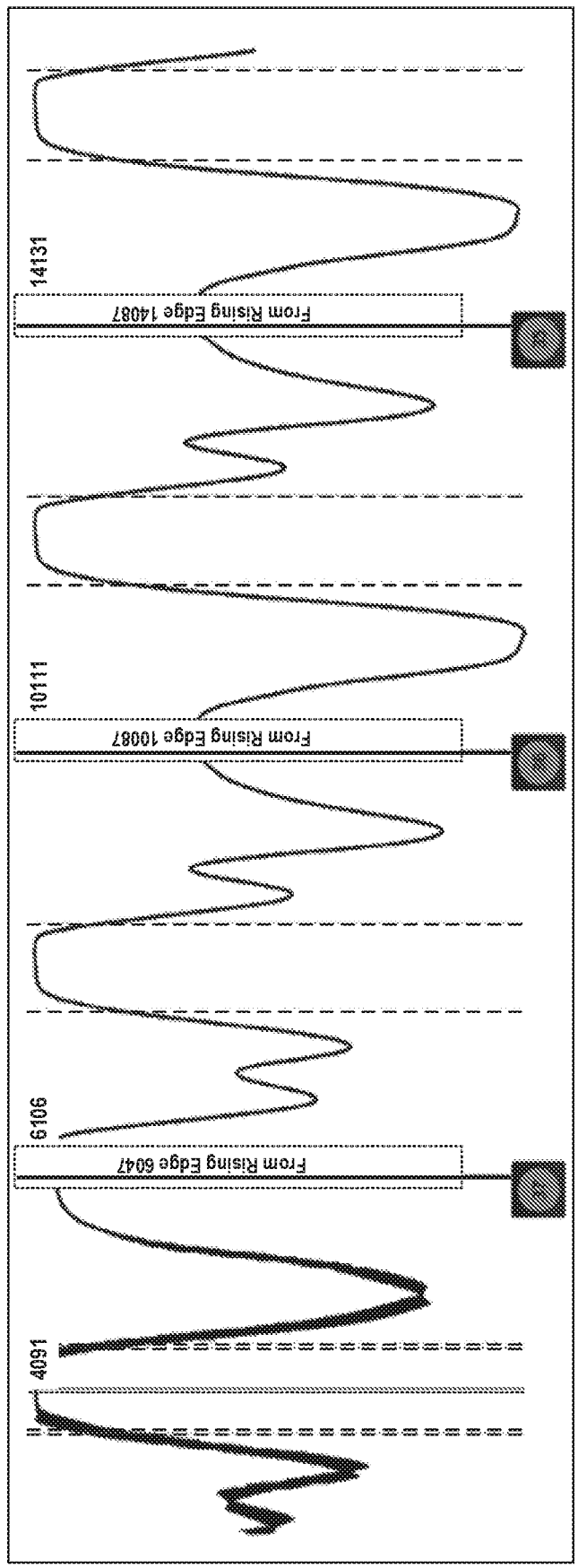
FIG. 6A shows sample results generated when one vessel is filled with water.
Figure 6B:
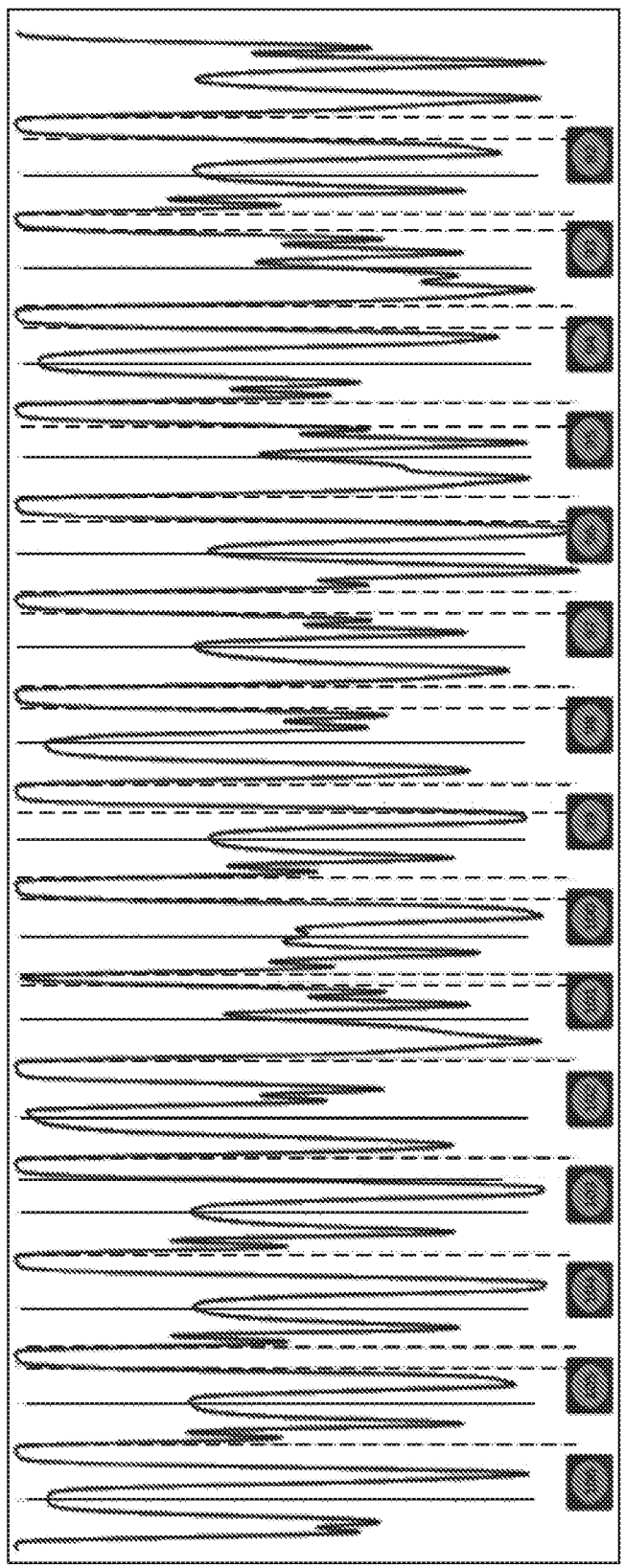
FIG. 6B shows sample results generated when multiple vessels are filled with water.
Figure 6C:
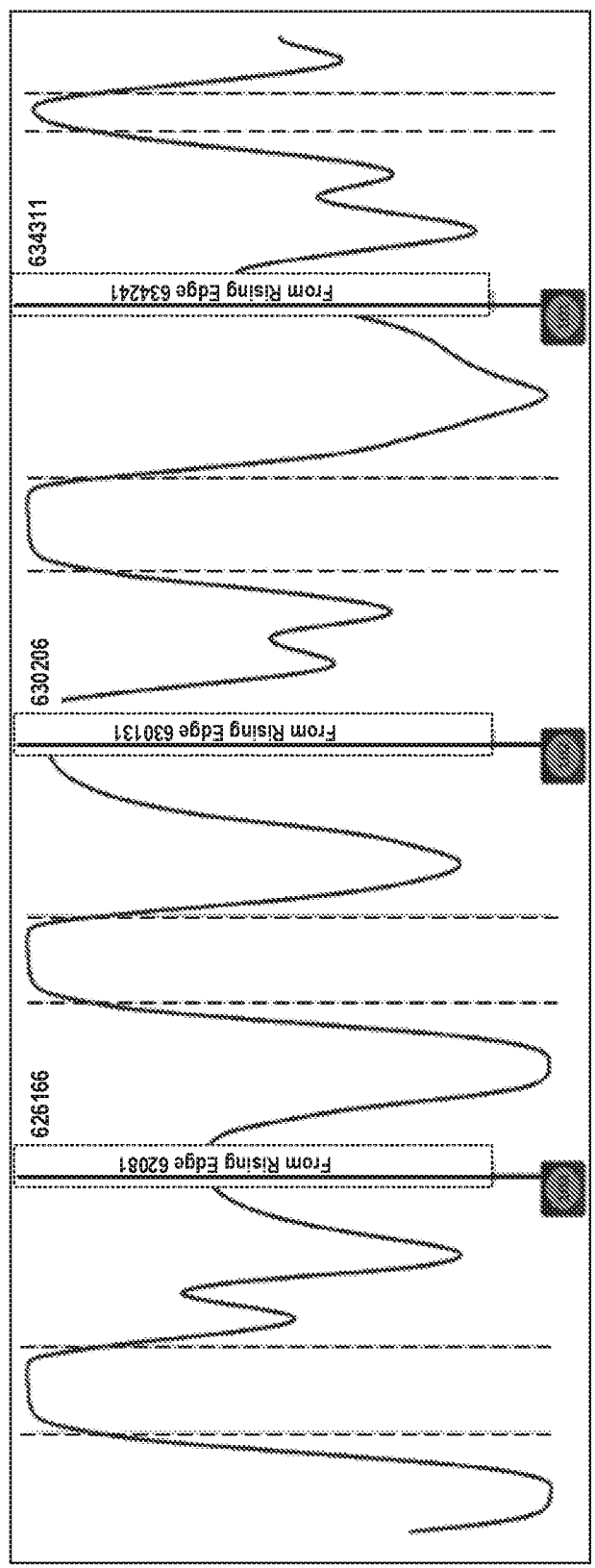
FIG. 6C provides additional results from this testing depicted in FIG. 6B.

FIGS. 6A-6C illustrate that vessels transmit better when filled with clear water. FIG. 6A shows sample results generated when one vessel (marked 37 in FIG. 6A) is filled with water. FIG. 6B shows sample results generated when multiple vessels (marked 106, 102, 98, and 94 in FIG. 6B) are filled with water. FIG. 6C provides additional results from this testing.

In some embodiments, reference measurements may be calculated between the cuvettes for dynamic source lamp referencing, thereby increasing the accuracy of testing results. The cuvette map described above may be used to identify regions between cuvettes to take the reference measurements. These measurements may then be analyzed to verify the validity of the readings and identify cuvette bath clarity or contamination.

Figure 7:
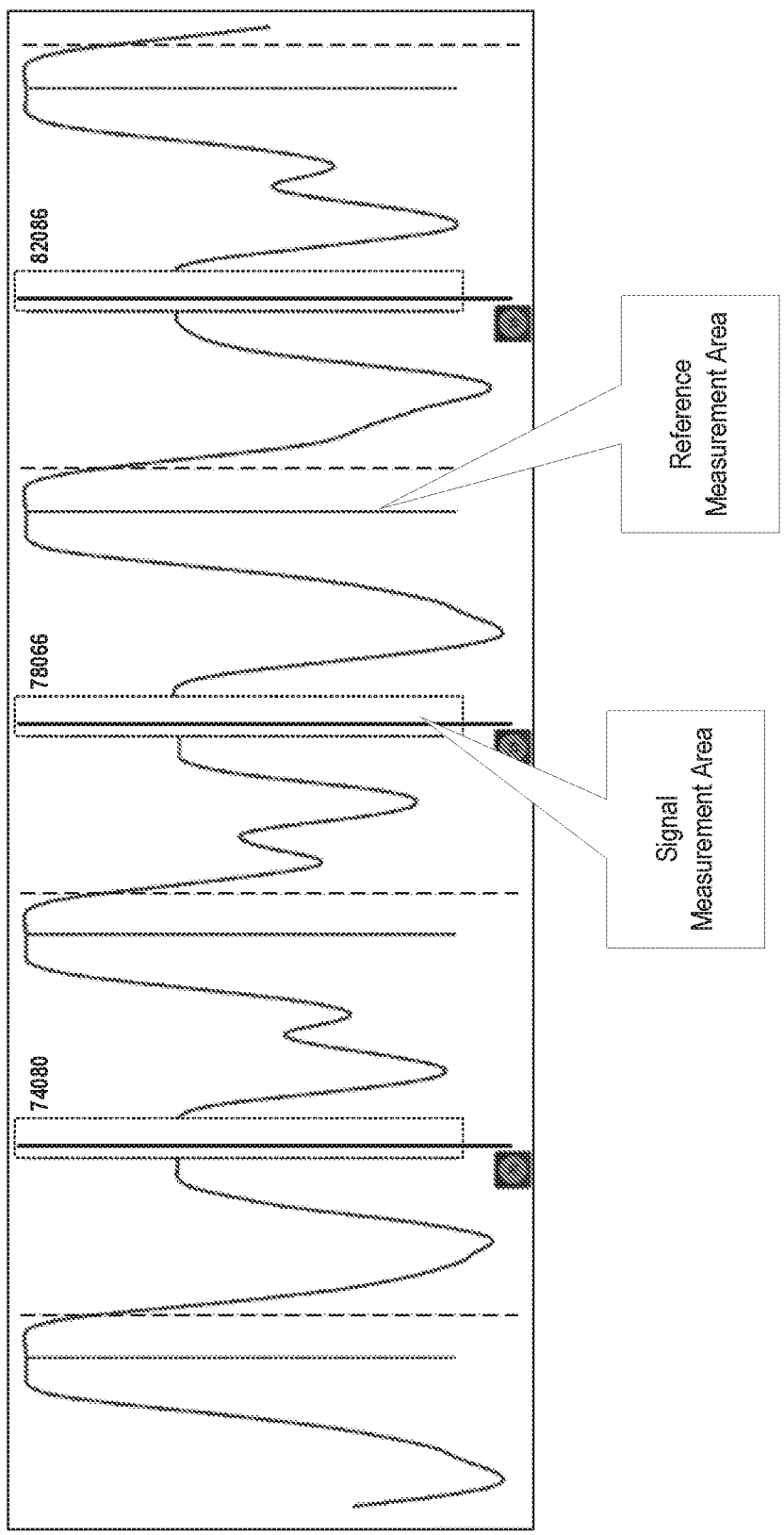
FIG. 7 illustrates an example photometric scanning of reaction ring vessels on an analyzer module.

FIG. 7 illustrates an example photometric scanning of reaction ring vessels on an analyzer module. The vessels in this example are not equally spaced. Cuvette mapping finds the ideal area for each vessel measurement (identified as the "Signal Measurement Area" in FIG. 7). It also finds the ideal space to make reference measurements between vessels (identified as the "Reference Measurement Area" in FIG. 7). Once the reference measurements have been acquired, they may be used to perform photometer calibration.

Figure 8:
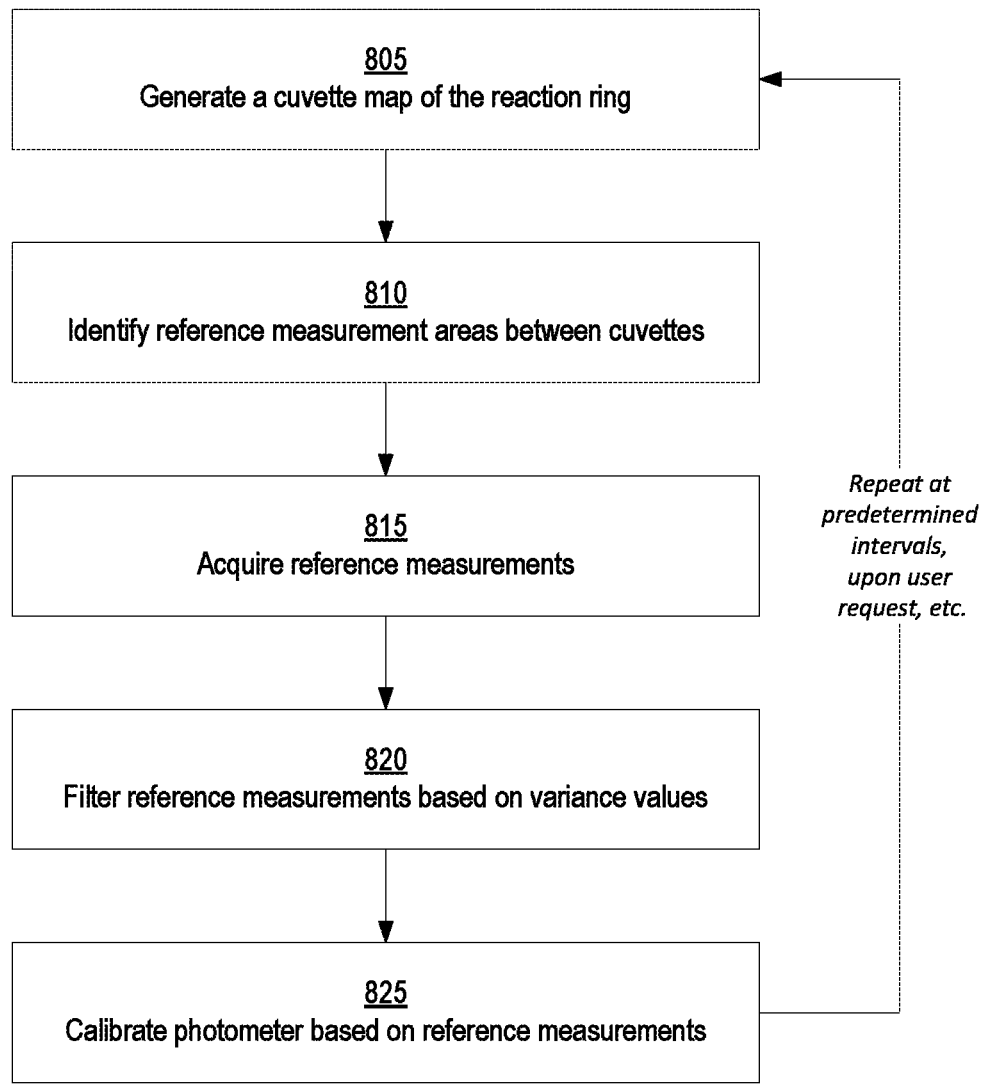
FIG. 8 provides a flowchart which illustrates a process for calibrating a photometer to correct source lamp drift and other issue.

FIG. 8 provides a flowchart which illustrates a process 800 for calibrating a photometer to correct source lamp drift and other issues. Starting at step 805, a cuvette map of a reaction ring is generated that identifies a plurality of cuvette locations, as described above with respect to FIG. 2. Next, at step 810, the cuvette map is used to identify reference measurement areas between the cuvette locations. The Cuvette map identifies the area for signal measurement at a negative offset from the rising edge (start of the gap), which will be the area inside that cuvette vessel.

At step 815, the reference measurements are acquired in the reference measurement areas. Each reference measurement is defined as the middle of the gap between cuvette vessels (i.e., rising edge and the next falling edge). Measurement data may be oversampled to eliminate noise and increase precision for both signal and reference measurements. During normal processing of the analyzer, measurements are triggered when the reaction ring moves past the photometer and the area of interest (signal then reference) is directly in front of the photometer. Since the ring is moving while (over)sampling in time, the analyzer is also covering an area of the vessel and the gap (termed "dynamic measurement"). For example, in one embodiment, 75 vessels will be passing in front of the photometer during each index, which results in 75 signal measurements and 74 reference measurements in one second. The analyzer may also position the reaction ring so that signal measurement area or reference measurement area is in front of the photometer to make static measurement. Here, the system would be only getting a slice of the area of interest; thus, this technique would mainly be used for diagnostics.

Optionally, at step 820, the reference measurements may be filtered based on their overall variance as a means of quality control. Additionally, in some embodiments, the variance data is used to evaluate the quality of other components of the analyzer system. As noted above, each signal measurement inside the vessel and reference measurement inside the gap between the vessels may be oversampled in at least one dimension (e.g., time and/or position). The variation or deviation of each sample from the mean measurement value will be small if the area under measurement is uniform. Bigger deviation indicates non-uniform area which, in turn, indicates a dirty incubation bath in case of reference measurement and scratched or otherwise unusable vessel for signal measurement. Thus, the quality of the vessel and the incubation bath may be detected based on the variance of the reference measurement samples. Moreover, because the source lamp variation is a slow cycle, an average of all high quality references may be utilized as the source lamp intensity reference for all vessels in each index.

Continuing with reference to FIG. 8, at step 825, the photometer is automatically calibrated using any technique generally known in the art. For example, in some embodiments, the reference measurements are compared to measurements from a predetermined standard setup, and the photometer is adjusted until the reference measurement matches the certified output of the standard setup. The term "predetermined standard setup" in this context means the standard/specified range (per wavelength) of the photometer as specified by the manufacturer. As is understood in the art, photometer source lamps can differ in intensity across wavelengths. Also, the lamp output changes as the lamp ages. In order to increase the "dynamic" range of the measurement, the photometer can scale the detector output to the predetermined standard setup. Calibration may be performed, for example, by providing one or more calibration parameters used by the photometer during operation (e.g., certain offset values associated with the source lamp).

Following calibration, the process 800 may be repeated as necessary. For example, in some embodiments, the process 800 is repeated at a predetermined time interval set by the user or system manufacturer. Thus, recalibration can be executed daily, hourly, etc. The process 800 may alternatively (or additionally) be performed at the occurrence of one or more events including, without limitation, system startup, detection of an error condition, etc. In some instances, the system may be configured to allow recalibration via the process 800 at any time based on a user request.

It should be noted that, using the process 800 described above with respect to FIG. 8, the reference measurements may be acquired during normal run without any performance impact. There is no need to calibrate measurements with a baseline reference reading during each startup. The techniques described herein also eliminate the need to position the ring at a gap to take periodic reference measurements, which saves time and reduces operational complexity. An added benefit of the process 800 is that a tight reference measurement may be calculated per index which, in turn, translates to more precise results compared to conventional systems.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, a computer readable program code for providing and facilitating the mechanisms of the embodiments of the present disclosure. The article of manufacture can be included as part of a computer system or sold separately.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes, and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for calibrating a photometer in an in-vitro diagnostics analyzer, the in-vitro diagnostics analyzer comprising the photometer and a reaction ring with a plurality of cuvette locations, the method comprising:
   generating, by a computer system, a cuvette map of the reaction ring identifying the plurality of cuvette locations;
   using, by the computer system, the cuvette map to identify a plurality of reference measurement areas between the plurality of cuvette locations;
   acquiring, by the computer system, a plurality of reference measurements in the reference measurement areas using the photometer;
   automatically, by the computer system, calibrating the photometer based on a comparison of the plurality of reference measurements to a predetermined standard setup of the photometer, wherein the predetermined standard setup of the photometer comprises a specified range of the photometer;
   determining, by the computer system, variance values corresponding to the plurality of reference measurements;
   prior to calibrating the photometer, by the computer system, filtering the plurality of reference measurements based on the variance values; and
   determining, by the computer system, a cuvette quality measurement based on the variance values.

2. The method of claim 1, wherein the plurality of reference measurements are acquired while acquiring a plurality of signal measurements corresponding to the plurality of cuvette locations.

3. The method of claim 2, wherein the plurality of reference measurements and the plurality of signal measurements are each oversampled in at least one dimension.

4. The method of claim 3, wherein the plurality of reference measurements and the plurality of signal measurements are each oversampled in time.

5. The method of claim 3, wherein the plurality of reference measurements and the plurality of signal measurements are each oversampled in position.

6. The method of claim 1, further comprising:
   determining an incubation bath quality measurement based on the variance values.

7. The method of claim 1, further comprising:
   after a pre-determined period following calibration of the photometer, acquiring a plurality of new reference measurements using the photometer; and
   automatically recalibrating the photometer based on a comparison of the new reference measurements to the predetermined standard setup.

8. A computer-implemented method for calibrating a photometer in an in-vitro diagnostics analyzer, the in-vitro diagnostics analyzer comprising the photometer and a reaction ring with a plurality of cuvette locations, the method comprising:
   identifying, by a computer system, a plurality of reference measurement areas between the plurality of cuvette locations in a cuvette segment assembly on the reaction ring;
   acquiring, by the computer system, a plurality of reference measurements in the reference measurement areas using the photometer;
   correcting, by the computer system, source lamp drift in the photometer by adjusting one or more calibration parameters based on a comparison of the reference measurements to a predetermined standard setup of the photometer, wherein the predetermined standard setup of the photometer comprises a specified range of the photometer;
   determining, by the computer system, variance values corresponding to the plurality of reference measurements;
   prior to correcting the source lamp drift in the photometer, by the computer system, filtering the plurality of reference measurements based on the variance values; and
   determining, by the computer system, a cuvette quality measurement based on the variance values.

9. The method of claim 8, further comprising:
   generating a cuvette map of the reaction ring identifying the plurality of cuvette locations.

10. The method of claim 9, wherein the cuvette map is used to identify the plurality of reference measurement areas.

11. The method of claim 9, wherein the plurality of reference measurement areas are identified during generation of the cuvette map.

12. The method of claim 8, wherein the plurality of reference measurements are oversampled in at least one dimension.

13. The method of claim 8, further comprising determining an incubation bath quality measurement based on the variance values.

14. The method of claim 8, further comprising:
after a pre-determined period following correction of the source lamp drift in the photometer, acquiring a plurality of new reference measurements using the photometer; and
automatically re-correcting the source lamp drift in the photometer based on a comparison of the new reference measurements to the predetermined standard setup of the photometer.

* * * * *